UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCTION OF TITANIUM-NITROGEN COMPOUNDS.

957,842.  Specification of Letters Patent.  Patented May 10, 1910.

No Drawing.  Application filed March 2, 1908.  Serial No. 418,847.

*To all whom it may concern:*

Be it known that I, CARL BOSCH, doctor of philosophy and chemist, subject of the King of Prussia, residing at Ludwigshafen-on-the-Rhine, Germany, have invented new and useful Improvements in the Production of Titanium-Nitrogen Compounds, of which the following is a specification.

In an article by Deville and Wöhler, *Annalen der Chemie*, vol. 103, page 231, it is stated that when a mixture of titanic acid and carbon are heated to about the melting point of platinum (*i. e.* to about 2,000° C.) and a stream of nitrogen is passed in contact with the same, the nitrogen is taken up and compounds containing titanium and nitrogen are formed. A temperature of 2,000° C., however, exercises a very deleterious influence on the apparatus used.

I have discovered that the production of titanium-nitrogen compounds (under which term I include both the titanium nitrids and also the so-called titanium cyanonitrid) by heating a mixture of titanic acid, or other titanium compound containing oxygen, with carbon in the presence of nitrogen gas, proceeds rapidly at a comparatively low temperature if an alkali salt be present during the reaction. The alkali salt appears to act as a catalytic agent and even very small quantities thereof greatly increase the rapidity of the reaction.

A minimum temperature of 1,100° C. is necessary when carrying out the process of this invention.

The following example will serve to illustrate further the nature of my invention, which, however, is not confined to this example. The parts are by weight.

Mix together 80 parts of titanic acid, 20 parts of wood charcoal, and 2 parts of sodium sulfate, or other alkali salt, such for instance as sodium carbonate. Heat this mixture for 2 hours in a current of nitrogen, at about 1,240° C. The reaction which takes place can be represented by the equation

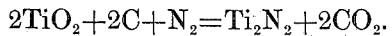
$$2TiO_2 + 2C + N_2 = Ti_2N_2 + 2CO_2.$$

Now what I claim is:

1. The process of producing titanium-nitrogen compounds by heating an oxygen-containing titanium compound, carbon and an alkali salt in the presence of nitrogen.

2. The process of producing titanium-nitrogen compounds by heating a mixture containing titanic acid, carbon and an alkali salt in the presence of nitrogen gas at a temperature above 1,100° C.

3. The process of producing titanium-nitrogen compounds by heating a mixture containing titanic acid, carbon and sodium sulfate in the presence of nitrogen gas at a temperature above 1,100° C.

In testimony whereof I have hereunto set my hand in the presence of two subscribing witnesses.

CARL BOSCH.

Witnesses:
J. ALEC. LLOYD,
JOS. H. LEUTE.